May 21, 1946.    L. S. OSBORNE    2,400,778
PORTRAIT CAMERA SHUTTER
Filed July 21, 1944    2 Sheets-Sheet 1

INVENTOR.
Leonard S. Osborne
BY
Sackhoff & Paddack
ATTYS

May 21, 1946.  L. S. OSBORNE  2,400,778
PORTRAIT CAMERA SHUTTER
Filed July 21, 1944  2 Sheets-Sheet 2

INVENTOR.
Leonard S. Osborne
BY
Murray, Sackhoff & Paddack
ATT'YS

Patented May 21, 1946

2,400,778

UNITED STATES PATENT OFFICE 2,400,778

PORTRAIT CAMERA SHUTTER

Leonard S. Osborne, Cincinnati, Ohio

Application July 21, 1944, Serial No. 545,953

6 Claims. (Cl. 95—55)

The present invention relates to camera shutters, and particularly shutters for studio portrait cameras.

An object of the invention is to provide a shutter mechanism for studio portrait cameras whereby, with the aid of meter controlled constant intensity of illumination, photographers are enabled to produce, with exceptional facility, any number of uniformly exposed plates or films that may be developed and also printed by uniform procedures and without the usual tedious individual expert attention to produce high-grade studio portraits at reduced costs.

A further object of the invention is to provide shutter structures of the class described that are adjustable to identical operation so that they may be used interchangeably in a plurality of similar studio cameras without sacrificing the aforementioned advantages.

Another object of the invention is to provide a camera shutter structure of the class described which operates with positive uniformity under all atmospheric and temperature conditions and which is not subject to variation by reason of variations in the individual operating technique of different operators.

A still further object of the invention is to provide a camera shutter structure wherein the speed of the shutter action is fixed invariably by operation under the influence of gravity on a falling body of a predetermined exact weight and wherein the effective size of the aperture may be adjustably fixed by the automatic successive release of two shutter bodies of predetermined specific weight through the influence of gravity at predetermined intervals established by the extent of movement of one of said falling bodies.

A still further object of the invention is to provide an electrically set and gravity timed shutter mechanism that is simple in construction and unfailingly uniform in operation.

These and other objects are attained by the means described herein and disclosed in the accompanying drawings, in which.

Heretofore high-grade portrait photographs have been produced only at considerable expense and with the aid of high skilled and painstaking efforts on the part of the camera operator as well as the operators in the developing room. High-grade camera shutters as heretofore known and used have presented various difficulties which have placed a heavy burden on the skill of the expert photographer in order to secure the desired results. Among the disadvantages in previously known shutters of different kinds, has been the sensitivity of the mechanism to atmospheric conditions and to temperature variations so that precision in timing throughout the different seasons could not be obtained without unfailing uniformity and as a result each exposed plate or film was handled as an individual problem requiring skilled attention and individual handling by experts in the dark room and in the printing room. In the production of high-grade studio portraits it has not been uncommon for the camera operator to expose an excessive number of plates in an endeavor to provide a greater likelihood of satisfying the customer without the necessity of another sitting.

By means of the invention herein, all difficulties which have heretofore been traceable directly or indirectly to lack of unfailing precision of performance of the camera shutter have been eliminated, and furthermore, it is entirely possible to utilize several different cameras in the same or in different studios to produce any number of plates or films which can be developed to optimum advantage by identical treatment and from which it is possible to print uniformly high-grade photographs using uniform printing, developing and fixing methods. Under these circumstances the camera operator is relieved of many heretofore necessary attentions to the camera and is enabled to devote practically all of his skill and attention to the composition of the subject and the proper instant for making the exposure.

Figure 1:
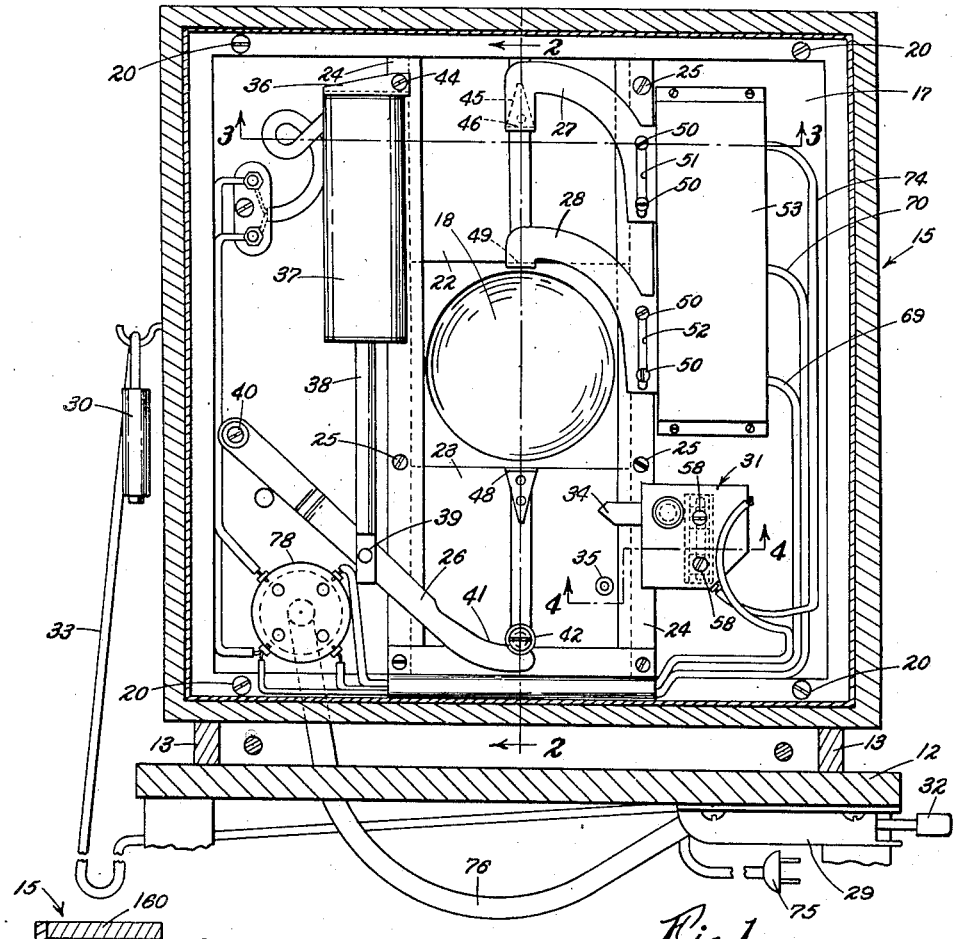
Fig. 1 is a cross-sectional elevational view of a studio portrait camera embodying the automatically controlled, gravity actuated shutter mechanism of the invention, and showing the shutter elements in position for focusing the camera.
Figure 2:
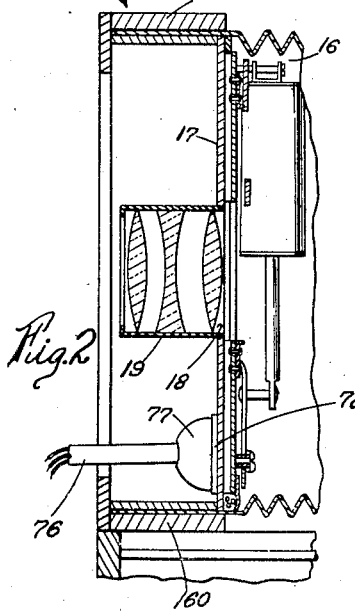
Fig. 2 is a cross-sectional view taken on line 2—2 of Fig. 1.
Figure 3:
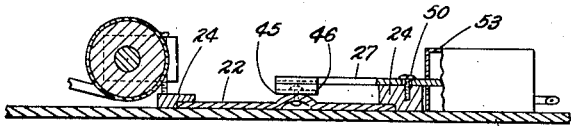
Fig. 3 is a cross-sectional view taken on line 3—3 of Fig. 1.
Figure 4:
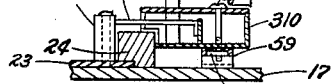
Fig. 4 is a cross-sectional view taken on line 4—4 of Fig. 1.

Reference is now made to Figs. 1 and 2 of the drawings wherein the camera base 12 is shown, with a suitably arranged sliding support 13 for the front end structure 15 of a bellows chamber 16 of any suitable description. The end structure 15 may be of any suitable construction and it includes a rectangular bounding wall 16a, the rearward end of which is closed by a rigid plate 17, having an aperture at 18 over which the lens 19 is suitably mounted. Plate 17 may comprise a light weight metal casting adapted for removable and interchangeable mounting on the frame by any suitable means such as screws 20. Midway between the vertical edges of plate 17 is a grooved vertical way 21 in which a pair of shutter elements 22 and 23 are freely guided for gravitational movement, a pair of side strips 24 being attached as by means of screws 25 to overhang the edges of shutter members 22 and 23 and thus form boundaries for the sides of way 21. From an inspection of Figs. 1, 6, 7 and 8, it will be noted that the upper shutter member 22 and the lower shutter member 23 are each shiftable vertically in way 21 under the influence and control of the hereinafter described means. The shutter elements 22 and 23 are plate-like structures, desirably of light-weight metal and they are balanced to a precisely uniform weight when all of the affixed attachments are applied thereto, so that the rate of travel of the two members when falling under the influence of gravity will be absolutely uniform. In this way the exposure timing is positive and uniform under all conditions, and it is also possible to construct a plurality of shutter mechanisms of the invention with the upper and lower shutter members, all precisely of the same predetermined weight so that each of the shutter mechanisms is readily interchangeable in one or more studio portrait cameras for assured uniform performance.

Figure 5:
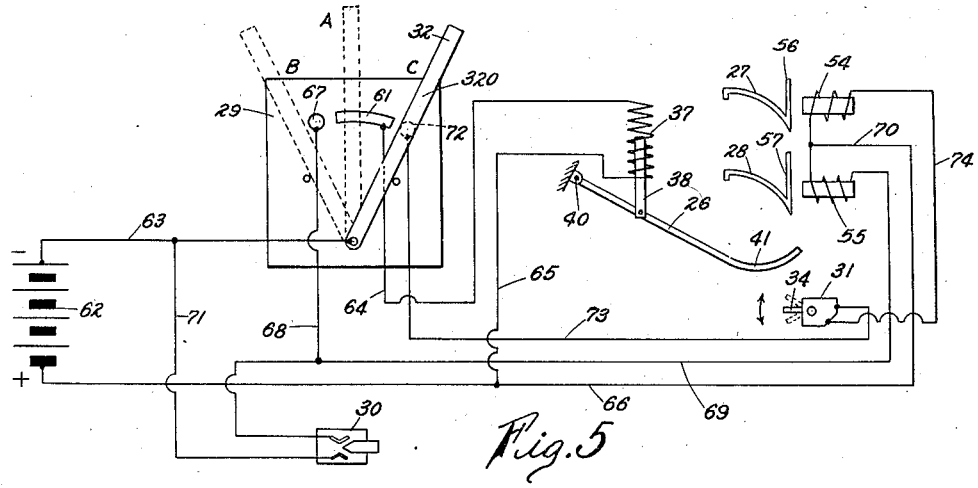
Fig. 5 is an electrical wiring diagram in conjunction with a schematic illustration of the control members of the shutter of the invention.

The manipulation and control of the shutter elements 22 and 23 is effected in a substantially automatic fashion by means of a pivoted lifting lever 26 and a pair of releasable holding latches 27 and 28, all of which are electrically actuated through the agency of a control circuit embodying a setting switch 29, hand switch 30, and an automatic trip switch 31 (see Figs. 1 and 5).

The set switch 29 may be conveniently fixed on the base 12, or elsewhere, so that its handle 32 is easily accessible to the operator while focusing and loading the camera preparatory to making the actual exposure.

The hand switch 30, which is of the momentary push button type, is mounted on the free end of an electrical extension cord 33 containing two of the conductors of the hereinafter described electrical circuit, and said cord is of a length which will permit the operator full freedom of access to the subject without relinquishing control of the exposure operation since the switch 30 may be carried about in the hand of the operator.

The trip switch 31 is so mounted that the end of its operating lever 34 is in the path of and is movable by a lower projection 35 on the face of the lower shutter element 23 (see Fig. 1).

Secured on a pivoted bracket 36 above lever 26 is a solenoid or electrical sucking coil 37, the armature 38 of which is pivoted at 39 intermediate the ends of lever 26. Lever 26 is pivoted at one end on a stud 40 while the upper edge of said lever is arcuately formed at 41 to ride beneath a roller 42 mounted near the lower edge of shutter member 23. It will be readily apparent that when solenoid 37 is energized, the armature 38 will lift lever 26, rocking it about its pivot 40 while the supporting bracket 36 of the solenoid is free to swing about its off-center pivot at 44 to accommodate the necessary swinging movement of lever 26. As lever 26 is raised, the lower shutter element 23 is lifted by it. In the event the upper shutter member 22 is resting upon its companion shutter member 23 below it, the two shutter elements are lifted simultaneously upon actuation of the lever 26 by solenoid 37.

Figures 6, 7, 8:
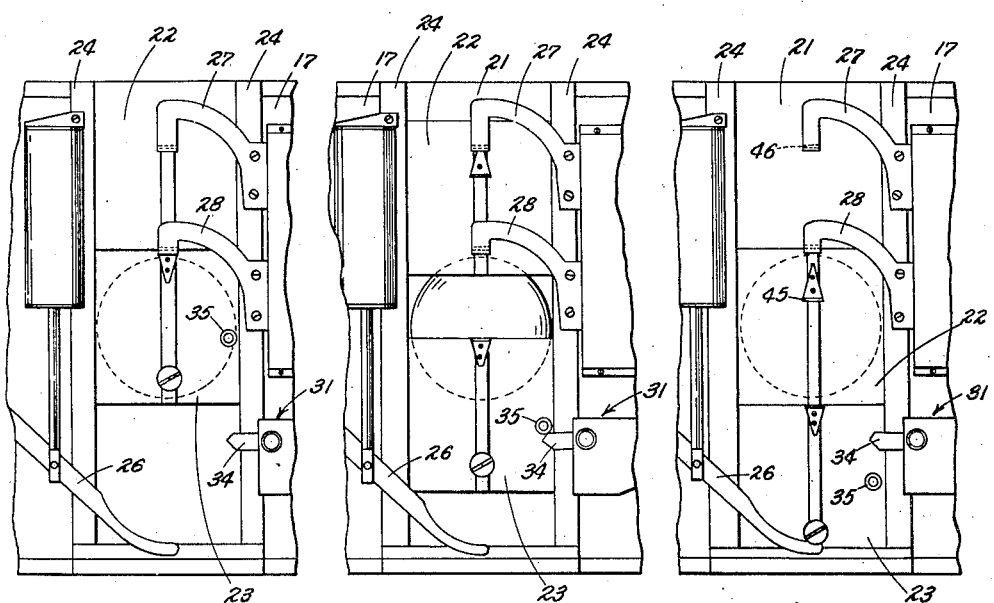
Fig. 6 is a fragmental elevational view of the shutter structure of Fig. 1 with the shutter elements in position for loading the plate carrier preparatory to making the exposure.
Fig. 7 is a fragmental view similar to Fig. 6 but showing the shutter elements with the aperture size established and the exposure in progress.
Fig. 8 is an elevational view, similar to Fig. 6 but showing the position of the shutter elements at the completion of the exposure.

As can be best seen in Fig. 8, the upper shutter element 22 has a shallow projection formed on a latch piece 45 adapted to engage upon a shallow rearwardly turned lip 46 formed integrally on the latch member 27, while the lower shutter element 23 has a latch piece providing a slightly longer lip 48 which is adapted to engage on a rearwardly turned edge 49 of latch member 28. Latches 27 and 28 are each mounted on a pair of screws 50 passing through the slots 51 and 52 respectively of the latches. The mounting of each of the latches onto screws in a slot, maintains the latching edges 46 and 49 respectively in position for engagement by the lip portions on the shutter elements. The latch member 27 is biased with its rearwardly turned edge in a position to cooperate with lip 45 but may rock slightly on its mounting on screws 50 sufficiently to release shutter 22 from its latched and elevated position.

The latch member 28 is offset to a slightly greater distance from the faces of shutter elements 22 and 23 so that the member 45 on shutter element 22 may pass beneath latch 28 without touching it. A casing 53 (see Fig. 1) has mounted therein a pair of electromagnets 54 and 55 which are operative on the ends 56 and 57 of the latches 27 and 28 respectively for releasing the respective latches upon actuation of the corresponding electromagnets (see Fig. 5).

The timing switch 31, as shown in Figs. 1 and 5, is operated by movement of trip lever 34, the switch being in a closed position only when the trip lever 34 is in the lowermost position. The casing 31a of switch 31 is supported for limited vertical adjustment on the face of plate 17 by means of a pair of screws 58 which pass therethrough and through a fixed slotted member 59 and into nuts 60. Upon loosening of screws 58 the casing 31a may be raised or lowered so that the position of lever 34 is correspondingly altered with the result that the switch will be actuated at a correspondingly different period during the fall of lower shutter element 23. The purpose of this adjustment is to provide for the modification of the shutter effective aperture size in the camera. It will be understood that this adjustment may be made initially by trial whereupon the screws 58 will be securely tightened so that they need not be again released except in the event the shutter be removed and applied to an entirely different photographic system under conditions which would require a modified aperture.

Reference is now made to the wiring diagram (Fig. 5) wherein it will be noted that the setting switch 29 has its handle 32 adjustable manually to three different positions indicated at A, B and C. The movable switch element 29a would normally be moved to and left in the central position A wherein it makes contact with a fixed contact 61 and establishes a circuit from the negative terminal of a source of low voltage direct current which may be a battery 62, through conductor 63 to moving contact 32a, thence through fixed contact 61, through conductor 64 to the coil of solenoid 37 from whence the current passes through conductor 65 which connects with conductor 66 and thence to the positive terminal of the current source. When the aforesaid circuit is established, the armature 38 of the solenoid raises and lifts pivoted arm 26 so that the shutter elements 22 and 23 are raised bodily and the respective catches thereof are engaged under latches 27 and 28 respectively. The operation just described will leave the upper and lower shutter elements latched in a raised position as shown in Fig. 6.

The switch handle 32 will then be moved to position B forthwith. In moving the movable contact 320 to the extreme position at B, said contact passes over a fixed contact 67 and momentarily establishes a circuit through conductor 68, thence through conductor 69 through the coil of electromagnet 55 from whence it returns through conductor 70 back to conductor 66 and to the positive terminal of the electrical source 62. In this momentarily energization of the coil of electromagnet 55, latch 28 is rocked on its mounting sufficiently to release the lower shutter member which drops and leaves the parts in the position shown in Fig. 1 so that the camera may be focused through the exposed opening 18. It will be noted, by reference to Fig. 5, that the setting switch remains deenergized after the momentary operation in moving it to the extreme position B. After the camera is focused on the subject to the satisfaction of the operator, the setting switch handle 32 is now thrown completely across to position C. In so doing the movable contact produces an impulse in electromagnet coil 55 which is ineffective to alter the position of the mechanism at this time, then the moving contact 320 passes across fixed contact 61 which energizes solenoid 37 and causes the lever 26 to raise the lower shutter element 23 to the position shown in Fig. 6 where the shutter elements remain latched in a raised position. The raising of shutter element 23 causes the roller stud 35 to engage trip lever 34 and raise it to its uppermost position as shown in Figs. 1 and 6. The roller stud thus remains in the elevated position shown in Fig. 6 and the trip switch 31 is left in an open circuit position. When handle 32 reaches position C, an open circuit arrangement is provided at the trip switch 31 and at the hand switch 30. When the hand switch 30 is closed by pressing the button in known manner, a circuit is established from the negative terminal of the current source 62 through conductors 63 and 71, thence through the switch 30 and through conductor 69, thence through electromagnet coil 55 which thereupon releases the lower shutter which begins to fall. When the lower shutter element 23 drops and the roller stud 35 strikes trip lever 34 of the trip switch 31 it establishes a closed circuit condition in switch 31. With switch 31 closed, a circuit is now established from the negaitve terminal of the current source through conductor 63, moving contact 320, fixed contact 72, thence through conductor 73, through the closed switch 31, and thence conductor 74 through coil of solenoid 54 which releases the upper latch 27. The return circuit from electromagnet 54 is through conductors 70 and 66 to the positive terminal of the current source. It will be apparent then that the upper shutter element 22 is released for gravitational descent at an interval of time determined by the amount of time that it took for the lower shutter element 23 to strike the trip switch arm 34. The effective aperture size is established in this way according the invariable operation of gravity and the two falling bodies, namely, upper and lower shutter elements 22 and 23 continue to drop so that the gap between them, while actually varying slightly in size during the shutter operation, serves as the practical equivalent of a fixed aperture while the lower shutter element 23 stops and the upper shutter element 22 completes the closing of the aperture and leaves the shutter elements in the position shown in Fig. 8 at the completion of the exposure. It will be noted particularly in Fig. 7 that the so called less-than-full aperture adjustments are attained as desired and that the exposure time will always be definitely fixed with relation to each adjustment. Under practical conditions the current is brought to the site of camera operation by a convenient connector plug 75 which connects with the setting switch 29 and from thence through a multiple conductor cord 76 and a plug 77 which is insertable at the front of the camera into a receptacle 78 from whence the hereinbefore described conductors are connected to the several electromagnets, the solenoid, and the trip switch. The temporary removal of plug 77 affords a convenient way of assuring that the camera will not be subject to unauthorized operation in the absence of the operator while the plug 75 provides a convenient manner of completely disconnecting the camera from a source of electrical energy. The operation of the device has been described concurrently with the description of the wiring diagram.

It will be understood that lighting conditions in the studio (not shown) are now subject to accurate control as to the intensity of illumination, by the use of various known means, including rheostats and light meters. The operator, having once set the camera for a perfect exposure under a given intensity of illumination, may thereafter duplicate the exposure time after time with successive films or plates of the same sensitivity by merely assuring that the same intensity of illumination has been established in the studio for each exposure. It is likewise feasible to utilize a plurality of cameras in the same or different studios, the cameras all being supplied with uniformly adjusted shutter mechanism of the invention and the studios all being provided with meter control intensity of illumination. The output of any number of cameras, thus correlated in shutter action may be handled by a single central developing and finishing room with the assurance that high-grade studio portrait work will result, and that the operators will not be required to devote the heretofore tedious attention to the respective plates or films, nor will it be necessary to devote any especial individual attention to the printing and finishing of the prints. The advantages in savings in time thereafter will be readily apparent. The camera operator can devote his entire time and attention to the subject with a minimum of attention to the semi-automatic operation of the shutter. A perfect exposure is assured from each plate or film. The savings in time and money that are made available by the uniformity of the exposed plates will be well understood from the foregoing description.

What is claimed is:

1. A shutter mechanism for a studio portrait camera comprising a vertical plate having an aperture therethrough, means on one face of said plate disposed vertically on opposite sides of said aperture and forming a vertical way, a pair of plate-like shutter elements movable freely in said vertical way, means for latching both of said shutter elements in an elevated position in said way, whereby the lowermost of the shutter elements closes the aperture in said plate, manually controlled means for releasing the latch for the lower-most shutter element, and electrical means including an electromagnet for the latch and a trip switch actuable by said lower-most shutter element during gravitational descent thereof for effecting automatic release of the latch for said upper shutter element.

2. A shutter mechanism for a studio portrait camera comprising a plate-like element adapted to form a closure for the front of the bellows chamber of such camera, said element having an aperture therethrough, a pair of shutter elements of predetermined uniform weight arranged in edgewise relation one above the other, means providing a vertical way wherein said shutter elements may operate gravitationally for opening and closing said aperture, a pair of latch members, means on the respective shutters for engaging on the respective latch members, a projection on the lower-most shutter element, an electrical trip switch having an arm extending alongside the path of the lower-most shutter element, said arm disposed at a predetermined position intermediate the upper-most and lower-most limits of movement of the lower shutter element, the projection on the last mentioned shutter element moving the arm of said trip switch to open and closed positions as said lower shutter element is raised and lowered in said way, a pair of electromagnets operative respectively on the latches for said upper and lower shutter elements, electric circuit means including said trip switch and said electromagnets, and a manual momentary switch arranged to complete a circuit through the electromagnet of the lower latch only for releasing the lower-most shutter element, said trip switch being actuated by said last-mentioned shutter element during gravitational descent thereof to establish an electrical circuit through the upper electromagnet whereby the upper latch is automatically released at a predetermined interval of time during the movement of the lower shutter element for establishing a planar shutter movement of predetermined effective aperture size during operation of said shutter elements.

3. In a studio portrait camera shutter mechanism the combination of a wall member having an aperture therethrough, means providing a vertical way on one face of said wall, a pair of shutter members of uniform weight arranged for gravitational descent, one below the other in said vertical way, electrically operable means for lifting the lowermost shutter element whereby both shutter elements are raised and the aperture in the wall is closed by the lower shutter element, latching means for the respective shutter elements for holding said elements in elevated relation, an electromagnet for each latching means and adapted when energized to release the associated latches, hand operated switch means for energizing one of said electromagnets for releasing the lower-most shutter element for gravitational descent in the way and automatic trip switch means operable by movement of said lower shutter element for energizing the other of said electromagnets for releasing the upper shutter element to gravitational descent at a predetermined space interval during the descent of said lower shutter element whereby a known less-than-full effective aperture is produced uniformly during every such operation of the hand operated switch.

4. In a studio portrait camera the combination of a vertical wall member having an exposure aperture therein, a pair of shutter elements mounted for gravitational sliding movement over a face of said wall in a vertically edgewise direction for controlling the aperture in said wall, means for raising the lower shutter element to a position wherein it closes the aperture in said wall and positions the upper shutter above said aperture, independent latching means for the respective shutter elements for releasably retaining them in the last mentioned elevated position, independent electromagnets for releasing the respective latching means, a momentary contact switch, an automatic trip switch actuatable to open and close by the raising and lowering movements of the lower shutter element, a setting switch including a pair of fixed contacts and a movable contact selectively engageable with said fixed contacts to carry electrical potential thereto, one of said pair of fixed contacts having electrical connection to one pole of the normally open trip switch, the other pole of said trip switch being electrically connected with an end of the electromagnet controlling the latch for the upper shutter element, the other of said pair of fixed contacts having electrical connection with an end of the electromagnet controlling the latch for the lower shutter element, a common return conductor for the remaining ends of both said electromagnets and conductors connecting the momentary contact switch electrically with the electromagnet controlling the latch for the lower shutter element independently of said setting switch.

5. An electrically set and gravitational actuated shutter mechanism for a studio portrait camera comprising a pair of shutter elements of accurately adjusted uniform weight disposed edgewise, one above the other, for vertical movement with respect to an exposure aperture to be controlled, means for latching the shutter elements independently in a raised position wherein both shutter elements are raised and such aperture is closed by the lower shutter element, electrical means comprising upper and lower electromagnets independently operable for releasing the latches of the respective shutters, a solenoid for lifting the lower shutter to latching position, a trip switch closable by downward movement of the lower shutter, a setting switch comprising three spaced fixed contacts and a moving contact for successively engaging said fixed contacts in order as said moving contact is moved between limits in either direction, a conductor constituting a hot supply line to the moving contact, a momentary hand switch having one pole thereof connected to said conductor in advance of the moving contact, a conductor connecting a first fixed contact of said setting switch to an end of the lower electromagnet, a conductor connecting a second fixed contact of the set switch to an end of the solenoid, a conductor connecting a third fixed contact of the setting switch to one pole of said trip switch, a conductor connecting the remaining pole of said trip switch to an end of the upper electromagnet, a common return conductor having the remaining ends of both electromagnets and of the solenoid connected thereto, and a conductor connecting the remaining pole of the momentary hand switch with the first mentioned end of the lower electromagnet.

6. An electrically set and released, gravity operated shutter mechanism comprising means forming a vertical way, a pair of shutter plates of equal weight disposed one above the other for gravitational descent in said way, independent upper and lower latches for retaining the respective shutter plates in raised position, upper and lower electromagnets operable respectively for releasing said upper and lower latches, a lifting means for the lower shutter plate, a solenoid for actuating said lifting means, a stud on the lower shutter plate, a normally open trip switch comprising a pivoted arm movable to switch closing position by said stud during gravitational descent of said lower shutter plate, a common return electrical conductor electrically connected with a common end of each of said electromagnets and the solenoid, an electric supply conductor, a manual set switch comprising a moving contact connected to said supply conductor and three fixed contacts successively connectable with said supply conductor through said moving contact, the first fixed contact being electrically connected with the lower electromagnet, the intermediate fixed contact being electrically connected with the solenoid, the last fixed contact being electrically connected to one pole of the normally open trip switch, a conductor electrically connecting the remaining pole of said trip switch with the upper electromagnet, and a momentary hand switch electrically connected and operable to form a closed circuit through the lower electromagnet when the moving contact of the setting switch is electrically connected with said last fixed contact of the setting switch.

LEONARD S. OSBORNE.